US010330140B2

(12) United States Patent
List et al.

(10) Patent No.: US 10,330,140 B2
(45) Date of Patent: Jun. 25, 2019

(54) DEVICE FOR SECURING A TENSION ELEMENT AGAINST UNINTENTIONAL RELEASE

(71) Applicant: ZF Friedrichshafen AG, Friedrichshafen (DE)

(72) Inventors: Matthias List, Friedrichshafen (DE); Ingo Decker, Friedrichshafen (DE); Siegfried Selbherr, Mengen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 194 days.

(21) Appl. No.: 15/311,336

(22) PCT Filed: Apr. 17, 2015

(86) PCT No.: PCT/EP2015/058342
§ 371 (c)(1),
(2) Date: Nov. 15, 2016

(87) PCT Pub. No.: WO2015/172968
PCT Pub. Date: Nov. 19, 2015

(65) Prior Publication Data
US 2017/0082135 A1    Mar. 23, 2017

(30) Foreign Application Priority Data
May 15, 2014    (DE) .......................... 10 2014 209 169

(51) Int. Cl.
*F16B 39/24*    (2006.01)
*F16C 35/06*    (2006.01)
(Continued)

(52) U.S. Cl.
CPC .............. *F16B 39/24* (2013.01); *F16C 25/06* (2013.01); *F16C 35/061* (2013.01);
(Continued)

(58) Field of Classification Search
CPC .. F16B 29/2825; F16B 39/24; F16B 37/0814; F16B 39/2825
(Continued)

(56) References Cited

U.S. PATENT DOCUMENTS 168,021 A * 9/1875 Holton .................... F16B 39/24
411/275
176,634 A * 4/1876 Holton ................ F16B 39/2825
411/274
(Continued)

FOREIGN PATENT DOCUMENTS

DE    1255398 B    11/1967
DE    4406270 C1    8/1995
(Continued)

OTHER PUBLICATIONS

German Search Report DE102014209169.1, dated Feb. 12, 2015. (7 pages).
(Continued)

*Primary Examiner* — Flemming Saether
(74) *Attorney, Agent, or Firm* — Dority & Manning, P.A.

(57) ABSTRACT

A device for securing a clamping element against unintentional release includes a disk-shaped structure penetrated in an axial manner by a bore hole. A driving profile is defined by the bore hole. The disk-shaped structure is positionable on a component such that the bore hole engages a profile on the component to establish a torque-proof coupling of the disk-shaped structure and the component. The disk-shaped structure has a pair of contact surfaces. Each contact surface of the pair of contact surfaces runs radially and is positioned at a respective axial side of the disk-shaped structure. A profile plane of the driving profile is tilted at an angle with
(Continued)

respect to a radial plane of each contact surface of the pair of contact surfaces. A related mounting arrangement is also provided.

22 Claims, 10 Drawing Sheets

(51) Int. Cl.
*F16C 25/06* (2006.01)
*F16C 35/063* (2006.01)
*F16D 1/108* (2006.01)
*F16H 61/36* (2006.01)
*F16C 19/49* (2006.01)
*F16C 19/06* (2006.01)
*F16D 1/10* (2006.01)

(52) U.S. Cl.
CPC ............ *F16C 35/063* (2013.01); *F16D 1/108* (2013.01); *F16H 61/36* (2013.01); *F16C 19/06* (2013.01); *F16C 19/497* (2013.01); *F16C 2226/80* (2013.01); *F16C 2361/61* (2013.01); *F16D 2001/103* (2013.01)

(58) Field of Classification Search
USPC .................... 411/230, 274, 275, 147, 154
See application file for complete search history.

(56) References Cited

U.S. PATENT DOCUMENTS

| | | | | | |
|---|---|---|---|---|---|
| 465,094 | A | * | 12/1891 | Fougere | .............. F16B 39/2825 411/230 |
| 497,666 | A | * | 5/1893 | Hudson | ............... F16B 39/2825 411/230 |
| 824,382 | A | * | 6/1906 | Quitman | ............... F16B 41/002 411/107 |
| 1,008,145 | A | * | 11/1911 | Heeter | .................... B42F 13/12 402/63 |
| 3,878,757 | A | * | 4/1975 | Puklus, Jr. | .......... F16B 37/0814 411/433 |
| 5,547,326 | A | | 8/1996 | Overhues | |
| 5,906,401 | A | * | 5/1999 | Viegener | ............... E03C 1/0401 285/90 |
| 6,254,322 | B1 | * | 7/2001 | Junkers | .................. F16B 31/04 411/14.5 |

FOREIGN PATENT DOCUMENTS

DE          20110111 U1     8/2001
DE      102013213514 A1    2/2014

OTHER PUBLICATIONS

International Search Report (English Translation) PCT/EP2015/058342, dated Jun. 24, 2015. (3 pages).

* cited by examiner

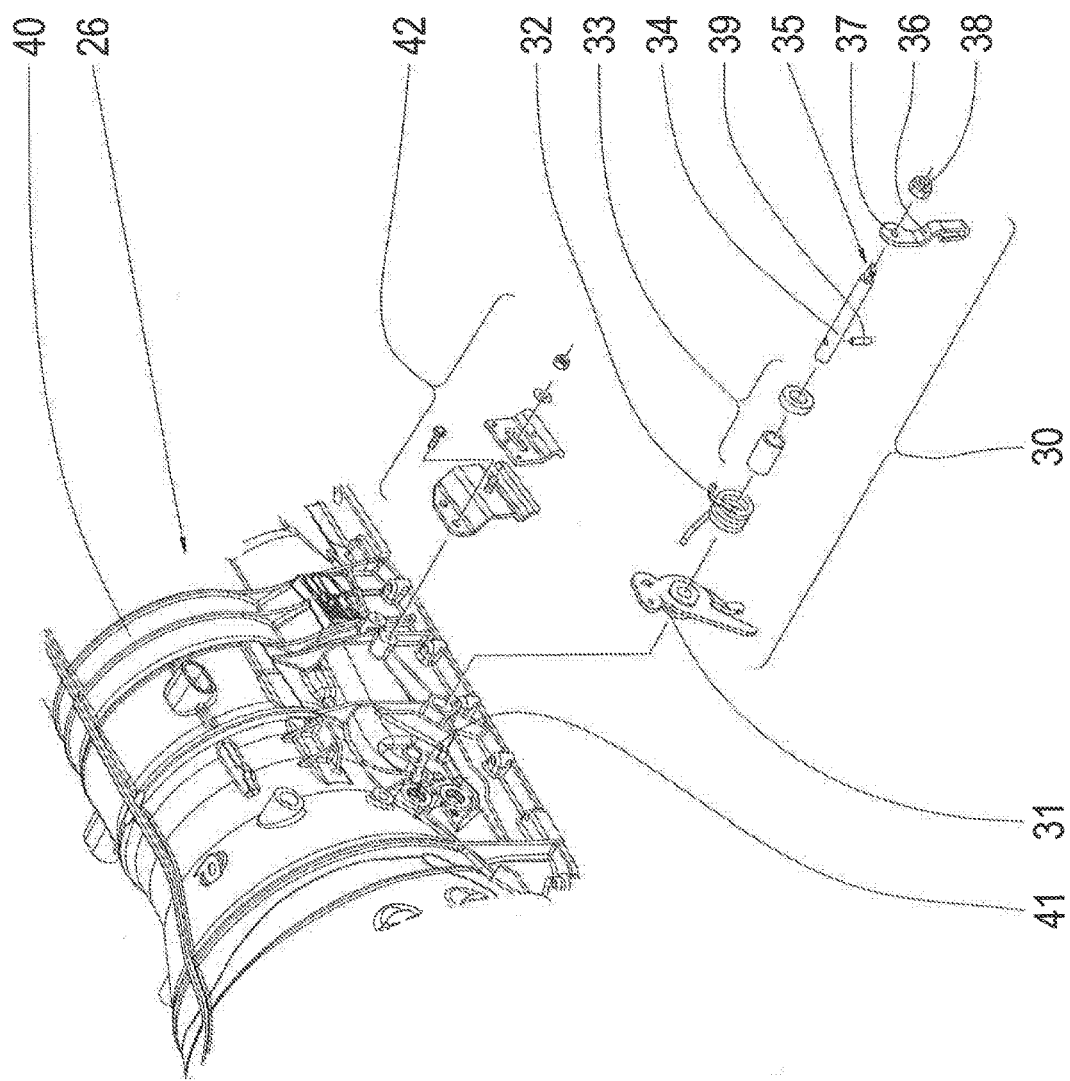

DEVICE FOR SECURING A TENSION ELEMENT AGAINST UNINTENTIONAL RELEASE

FIELD OF THE INVENTION

The invention relates generally to a device for securing a clamping element against unintentional release, with a disk-shaped structure that is penetrated in an axial manner by a bore hole, whereas the structure is provided for an inner diameter with a driving profile defined by the bore hole, which, in the placement of the structure, engages with the bore hole on a radially inner component in a profile provided on the part of such component and thereby establishes a torque-proof coupling of the structure with this component, and whereas the structure is provided, in an axial manner on both sides, with contact surfaces that run in a radial manner. Furthermore, the invention relates generally to a mounting arrangement with which the aforementioned device is applied.

BACKGROUND

In the field of transmissions, roller bearings are sometimes mounted with the assistance of clamping nuts, which attain a sufficient axial pre-tensioning of the successive roller bearing(s). In doing so, the respective clamping nut is guided with an internal thread to a corresponding external thread of the respective transmission shaft, and is screwed against one or more internal rings of the roller bearing until the desired pre-tensioning is achieved. However, micro-movements in the form of minor twists of the internal ring that is located directly adjacent and serves as the head contact surface of the clamping nut may lead to the unintended release of the clamping nut, which may then result in a corresponding loss of the pre-tensioning and possibly even a total failure of the respective transmission. For this reason, with mounting arrangements of bearings devices, devices that prevent the unwanted release the respective clamping nut are frequently used.

DE 10 2013 213 514 A1 shows a device that features a disk-shaped structure. Thereby, such structure is penetrated axially by a bore hole, into which a driving profile protrudes. Upon the placement of the structure, the driving profile then engages in a radially inner component in a profile provided on the part of such component, and establishes a torque-proof coupling of the structure with such component. Thereby, with a mounting arrangement for roller bearings, the device is used on a transmission shaft and is provided between one of the rolling bearings and a clamping nut, which is guided with an internal thread to an external thread of the transmission shaft. The driving profile of the device then establishes a torque-proof connection to the transmission shaft, whereas the device, axially on both sides of the contact surfaces that run radially, is in contact, on the one hand, with the clamping nut and, on the other hand, with an internal ring of the adjacent roller bearing, in order to transfer the pre-tensioning force of the clamping nut to the internal ring of the rolling bearing.

SUMMARY OF THE INVENTION

Exemplary aspects of the present invention assist with providing a device that can be mounted on a radially inner component in a manner that is as free of backlash as possible, but thereby carrying into effect a mounting with the least possible expense.

According to a first aspect of the invention, a device features a disk-shaped structure, which is penetrated in an axial manner by a bore hole. Thereby, the structure is provided for an inner diameter with a driving profile defined by the bore hole, which, in the placement of the structure, engages with the bore hole on a radially inner component in a profile provided on the part of such component and thereby establishes a torque-proof coupling of the structure with this component. In addition, the structure is provided, in an axial manner on both sides, with contact surfaces that run in a radial manner.

According to a second aspect of the invention, a device features a disk-shaped structure that is penetrated in an axial manner by a non-circular inner contour. Thereby, the structure is provided on a surface defined by an inner contour with a driving profile, which, in the placement of the structure, engages with the inner contour on a radially inner component in a profile provided on the part of such component and thereby establishes a torque-proof coupling of the structure with this component. In addition, the structure is provided, in an axial manner on both sides, with contact surfaces that run in a radial manner.

Within the meaning of the invention, the disk-shaped structure may be designed in one piece and is accordingly present as a ring-shaped formation, whereas, as an alternative to this, a multi-part arrangement is possible, with which the disk-shaped structure penetrated with the bore hole is then composed of several ring segments.

Within the meaning of the invention, "axial" is understood as an orientation in the direction of a longitudinal center axis of the disk-shaped structure of the securing device, while "radial" means an orientation in the direction of a radius of the structure shaped in a manner that is essentially rotationally symmetrical. Furthermore, the "radially inner component" may, in principle, include a stationary component or a rotating component, thus a shaft.

Exemplary aspects of the invention now include the technical teaching that a profile plane of the driving profile is tilted at an angle with respect to radial planes of the contact surfaces. Thus, in accordance with exemplary aspects of the invention, a plane in which the profile of the disk-shaped structure extends runs under an angle to the contact surfaces that run in a radial manner. Therefore, if the device is placed, with its bore hole or with its non-circular inner contour, at a radially inner component and, with its contact surfaces, is aligned in a radial manner through contact with components that are located on both sides in an axial manner, the driving profile provided at the structure is subsequently tilted at an angle with respect to a radial direction.

Such an arrangement of a securing device has the advantage that, due to the orientation of the profile at an angle to the contact surfaces, upon the pre-tensioning of the device, the specified tilting of the driving profile takes place with respect to the profile of the radially inner component. Viewed across the circumference, in certain areas, such tilting has the consequence of the pushing together of the two profiles, by which, with a corresponding arrangement of the profile, they are pressed into each other into such areas with their flanks. Thereby, any backlash is reduced in the circumferential direction, and, with a corresponding selection of the angle, a press fit is thus realized. However, since a transition from a clearance fit to a press fit takes place only upon this tilting, the device may, in the forefront, be pushed to the radially inner component with a low degree of effort. In addition, other measures for minimizing backlash in the circumferential direction, such as adhering, may be omitted.

In contrast to this, the profile of the securing device of DE 10 2013 213 514 A1 with respect to the associated profile of the shaft must be designed in such a manner that, upon the placement of the securing device on the shaft, a press fit is formed between the two components and any backlash in the circumferential direction is prevented. However, in this case, the pushing or the placement of the securing device on the shaft would be designed with corresponding expense, such that installation costs would increase. Other measures, such as adhering or the use of other filler material after the pushing, would also make assembly and disassembly more expensive. When using an adhesive or any other filling material, the components must be cleaned after disassembly, which also increases the costs of disassembly.

Upon the use of the device in accordance with exemplary aspects of the invention in a mounting arrangement, this is then set on a shaft as a radially inner component and is placed between a clamping element and an additional component. The clamping element, which is preferably a clamping nut, is likewise guided to the shaft and pre-tensions the device, whereas the device, on its contact surfaces, is in contact with the clamping element (on the one hand) and the components (on the other hand) and engages in a profile of the shaft in a torque-proof manner through its driving profile.

Thereby, the profile of the shaft is designed "with a clearance fit corresponding" to the driving profile of the securing device, whereas, in this case, a design of the profile is meant as a counterpart to the driving profile with a clearance fit with corresponding tolerances. Thus, if the device were placed, without a pre-tensioning, by the clamping element on the profile of the shaft, any backlash would be adjusted based on the clearance fit between the two profiles. Only upon the pre-tensioning of the device is the driving profile then tilted at an angle with respect to the profile of the shaft, by which any backlash between the two profiles is eliminated in sections.

In the case of a one-piece design of the structure of the device, it is then pushed to the desired location by a shaft end, whereas, based on the one-piece design, there is a simple assembly, since the securing device still does not have to be assembled beforehand. By contrast, a multi-part design of the securing device brings with it the advantage that it may, in principle, be provided at locations on the respective shaft, to which a pushing of a shaft end is not possible.

According to one embodiment of the invention, the driving profile of the securing device is formed by at least one individual profile, of the flanks of which oriented in the circumferential direction, at least one flank features a wedge-shaped profile. Of the flanks oriented in the circumferential direction, at least one does not run in the circumferential direction with a uniform extension. This is because, only through such a design of the driving profile, with the use of the securing device in a mounting arrangement, is the reduction of any backlash at a correspondingly designed profile brought about, if, in the course of a pre-tensioning, a tilting of the two profiles to each other takes place. Within the meaning of the invention, "wedge-shaped" is meant as a flat profile of the respective flank, analogous to an inclined plane or a curved profile.

In an additional form of the aforementioned embodiment, the driving profile is then designed as a toothing, in particular as an involute toothing. Thereby, on the one hand, a reliable, torque-proof connection of the device with the radially inner component may be realized, but at the same time, in particular with an involute toothing upon tilting, the desired effect as described above may be achieved. Apart from an involute toothing, the toothing may be otherwise designed, whereas, however, the wedge-shaped profile must be realized on at least one tooth flank. Toothings according to DIN5480, ISO4156, ANSI B92.1 and toothings that are designed similarly to such norms, such as a toothing similar to "DIN5480 41.5×0.5×81×9H 9h," are particularly preferable. Within the meaning of the invention, it is also conceivable to arrange the driving profile (thus, for example, the toothing) over the entire circumference of the inner diameter of the structure or provide this only in sections.

According to an additional arrangement of the invention, the angle is selected such that, with an arrangement of the structure on the radially inner component and the tilting of the driving profile with respect to the profile of the component in at least a circumferential area, any backlash between such two profiles is eliminated. Particularly preferably, the angle is calculated according to $$j_n - \left[\left(d \cdot \sin\alpha_t - \frac{j_n}{2}\right) \cdot \cos\varphi + \frac{b}{2} \cdot \sin\varphi - \left((d \cdot \sin\alpha_t) - \frac{j_n}{2}\right)\right] \leq 0$$

Thereby, $j_n$ is a normal backlash of the toothing, $\alpha_t$ is an operating pressure angle, d is a pitch circle diameter and $\varphi$ is the angle to be calculated. A calculation of the angle has the advantage that an optimal selection of the tilt angle can be made with respect to the respective design of the profiles. According to an advantageous additional form of the invention, the value of the angle $\varphi$ is in a range between 1.5° and 2.5°. At this angle, in particular with a design of a toothing that is similar to DIN5480 N41.5×0.5×81×9H×9h, a tilting of the device when used in a mounting arrangement is achieved, which results in a sufficient reduction to any backlash. Particularly at an angle of 2°, viewed across the circumference, any backlash at multiple locations thereby becomes zero. The number of locations distributed across the circumference at which a backlash of zero is achieved depends on the material, in particular on the strength, modulus of elasticity and plastification behavior of the material.

It is an advantageous additional form of a mounting arrangement that the driving profile of the securing device and/or the profile of the shaft in the course of pre-tensioning by the clamping nut and the tilting is partially subjected to a plastic deformation. In other words, the angle is selected to be so large that the profiles are pressed against each other under elastic and plastic deformations. Thereby, any backlash across a larger area in the circumferential direction is eliminated. In order to illustrate the partially plastic deformation, one of the two components (that is, either the device or the shaft) is designed from a material with lower strength and hardness, but both of the components coming into contact with each other are made from one and the same material.

In an additional form of the invention, the mounting arrangement serves the purpose of mounting at least one roller bearing, the axial pre-tensioning of which is adjustable by the clamping element. Alternatively, the mounting arrangement serves the purpose of mounting a component in the form of a mounting flange. Furthermore, within the framework of the invention, it is also conceivable that, with the mounting arrangement, a torque of the shaft is to be transferred to the device in a manner that is as free of backlash as possible, whereas, in this case, the device is designed as a torque-transferring component, such as a gear wheel or a brake disk. Thus, in principle, through the use of a device in accordance with the invention in a mounting arrangement, on the one hand, anti-rotation protection or, alternatively, a backlash-free transfer of torque can be realized.

BRIEF DESCRIPTION OF THE DRAWINGS

The invention is not limited to the specified combination of the characteristics of the principal claim or the claims dependent on it. There are also options for combining individual characteristics with one each other, also to the extent that they arise from the claims, the following description of the exemplary embodiments of the invention or directly from the drawings. Any reference of the claims to the drawings through the use of reference signs should not restrict the scope of protection of the claims.

Additional embodiments of the invention, which are described below, are shown in the drawings. The following is shown:

FIG. 6A an exploded view of a gear selector for a transmission known from the prior art;

DETAILED DESCRIPTION

Figure 1:
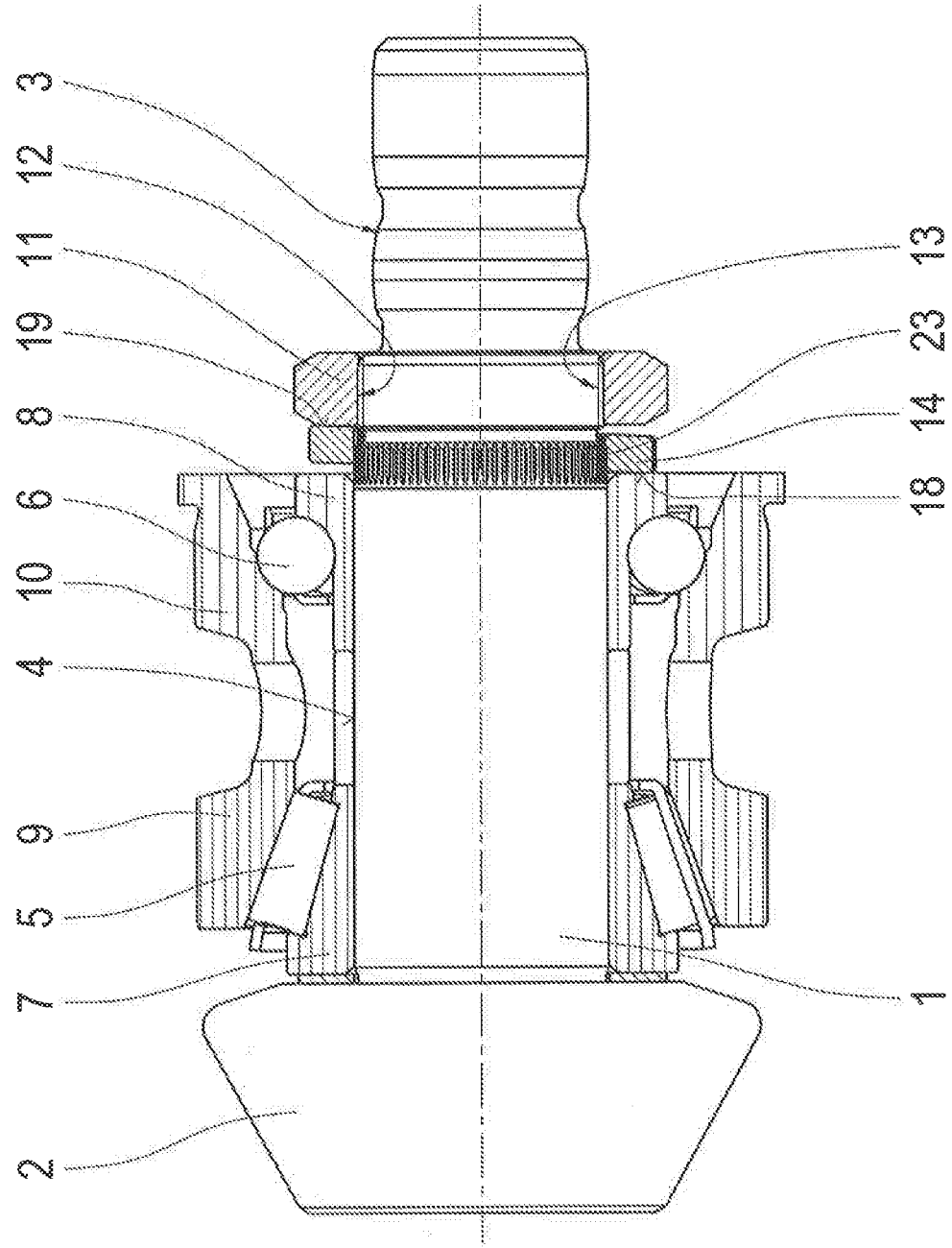
FIG. 1 a sectional view of a bearing assembly of a transmission shaft with a device according to a first embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first application example of the invention. FIG. 1 shows a sectional view of a bearing assembly of a shaft 1 formed as a bevel pinion shaft. In this case, this bevel pinion shaft may be used, for example, for connecting an output side of an automatic transmission with an axle differential on the drive side of the automatic transmission. The shaft 1 is equipped at a front end with a bevel pinion 2, across which, in the installed state, a tooth engagement with a crown wheel of the axle differential is then established. By contrast, a spline 3 is formed at an end opposite to it.

As can be seen from FIG. 1, the bearing arrangement of the shaft 1 includes two rolling bearings, which are placed in a bearing seat area at the shaft 1 following the bevel pinion 2 in an axially direct manner, and are present in the form of a tapered roller bearing 5 and an angular ball bearing 6. Thereby, both bearings are equipped with an internal ring 7 and 8 allocated to each, along with the respective associated external rings 9 and 10. In the present case, a pre-tensioning of the internal rings 7 and 8 of the two rolling bearings is ensured by a clamping element 11 in the form of a clamping nut, which is guided with an internal thread 12 to an external thread 13 of the shaft corresponding to it. Thereby, the clamping element 11 pre-tensions the internal rings 7 and 8 against the bevel pinion 2 of the shaft 1.

In the installed state of the bearing arrangement, in particular upon a change in loads, the internal rings 7 and 8 may carry out micro-movements relative to the shaft 1 in the form of minor twists. If such micro-movements are then transferred to the clamping element 11, a release of the clamping element 11 and thus a loss of the pre-tensioning could arise. Therefore, in order not to transfer this twisting to the tensioning element 11, a device 14 is placed in an axial manner between the angular ball bearing 6 and the clamping element 11, which device is arranged in a torque-proof manner at the shaft 1 and the exact structure of which is more specifically described with the assistance of the additional views of FIGS. 2 through 4 in the following: as can be seen in this case, the device 14 is formed by a one-piece, disk-shaped structure 15, which is penetrated by a bore hole 16 and therefore as a whole forms a ring shape. Within the bearing assembly in FIG. 1, the device 14 is set with the bore hole 16 on the shaft 1, whereas a torque-proof connection with the shaft 1 is realized by a driving profile 17, which is arranged at an inner diameter of the structure 15 defined by the bore hole 16.

Figure 3:
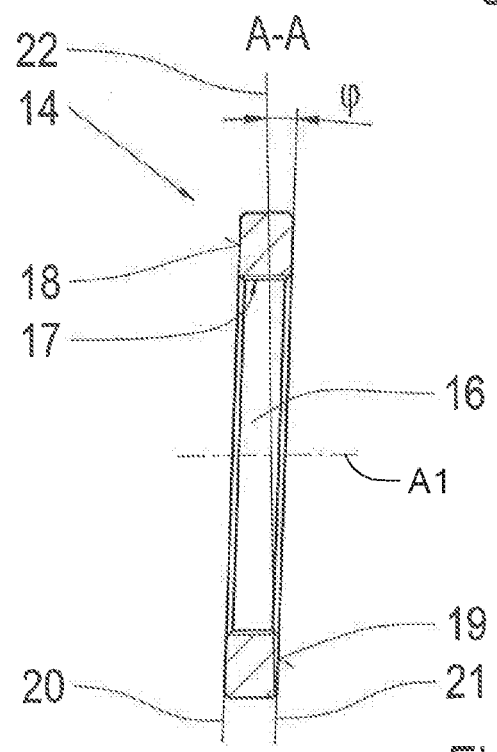
FIG. 3 a sectional view of the device, cut along the line A-A in FIG. 2.

As can be further seen from the sectional view of the device 14 in FIG. 3, the device 14 has, in an axial manner on both sides, the contact surfaces 18 and 19, of which, within the bearing assembly in FIG. 1, the contact surface 18 establishes a contact of the device 14 with the internal ring 8 and the contact surface 19 establishes a contact with the clamping element 11. Thereby, the contact surfaces 18 and 19 run in a radial manner into the planes 20 and 21 corresponding to each, and are aligned to each other in a parallel manner.

Figure 2:
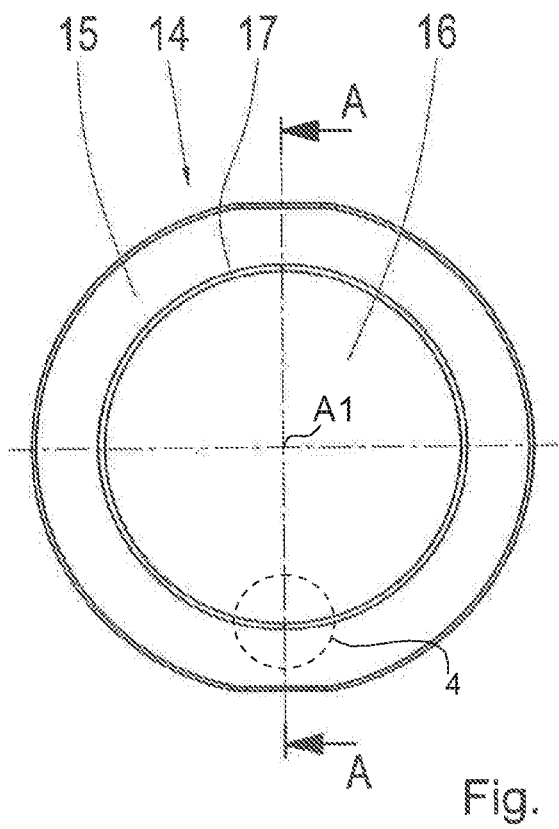
FIG. 2 a detail view of the device from FIG. 1.

As a special feature, a profile plane 22, along which the driving profile 17 extends, now runs at an angle φ both at the plane 20 and the plane 21 and perpendicularly to an axis A1 defined by the bore hole 16. As a result, the driving profile 17 is tilted from the radial lanes 20, 21 of the contact surfaces, 18, 19 by the angle φ, whereas, in this case, the angle φ is (as an example) in the range of 1.5° to 2.5°. Furthermore, the driving profile 17, as can be seen from the detail view in FIG. 4 for the reference area 4 of the device 14 shown in FIG. 2, is designed as an involute toothing, which extends in the circumferential direction over the complete inner diameter of the structure 15 defined by the bore hole 16. The angle φ is calculated according to the formula $$j_n - \left[\left(d \cdot \sin\alpha_t - \frac{j_n}{2}\right) \cdot \cos\varphi + \frac{b}{2} \cdot \sin\varphi - \left((d \cdot \sin\alpha_t) - \frac{j_n}{2}\right)\right] \le 0$$

whereas jn forms a normal backlash of the involute toothing, at forms an operating pressure angle of the involute toothing and d forms a pitch circle diameter of the toothing.

If the bearing assembly in FIG. 1 is now mounted, after the placement of the two roller bearings on the bearing seat area 4, the device 14 is threaded on the shaft 1. Thereby, on the part of the shaft 1, a profile 23 corresponding to the driving profile 17 (that is, an involute toothing fit to the involute toothing of the device 14) is arranged. However, the profile 23 of the shaft 1 is aligned in a radial direction and thus, in contrast to the device 14, is not tilted at an angle. In addition, the driving profile 17 and the profile 23 are each designed for each other in such a manner that a clearance fit is predominant and the device 14 can be easily threaded accordingly.

Figure 4:
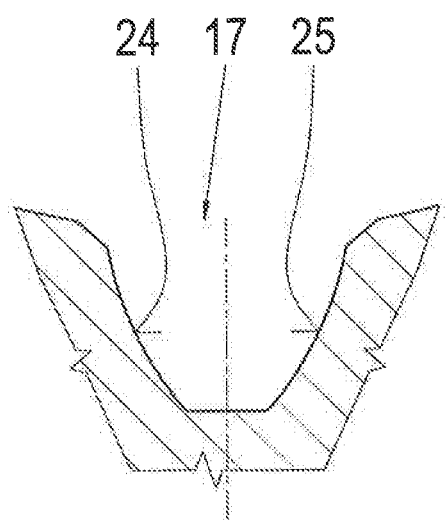
FIG. 4 a detail of the device from FIG. 2.

However, if the clamping element 11 is screwed onto the shaft 1 and arrives in contact with the contact surface 19 of the device 14, the device 14 is subsequently pressed, also with its contact surface 18, at the internal ring 8. However, since the two contact surfaces 18 and 19 run to the profile plane 22 of the driving profile 17 at the angle φ, the clamping of the device 14 between the internal ring 8 and the clamping element 11 results in a tilting of the driving profile 17 to the profile 23 of the shaft 1 by the angle φ. Due to this tilting, the flanks 24 and 25 of the driving profile 17, which can be seen in FIG. 4, are, viewed across the circumference, pressed in areas at flanks (which in the present case are not shown in further detail) of the profile 23, and thus, in such areas, any backlash is reduced to 0 and to less than 0. Thereby, the clearance fit predominant upon the threading of the device 14, in some sections of the circumferential side, is transferred into press fits.

In the present case, the angle φ is selected to be so large that the formation of press fits takes place over the largest possible areas in the circumferential direction, whereas, on the part of the device 14 and, if applicable, the shaft 1, in addition to elastic deformations, plastic deformations will also arise, in part due to the selected angle φ. Due to the formation of press fits, the device 14 subsequently may no longer rotate with respect to the shaft 1, such that no micro-movements whatsoever can be transferred to the clamping element 11.

Figure 5:
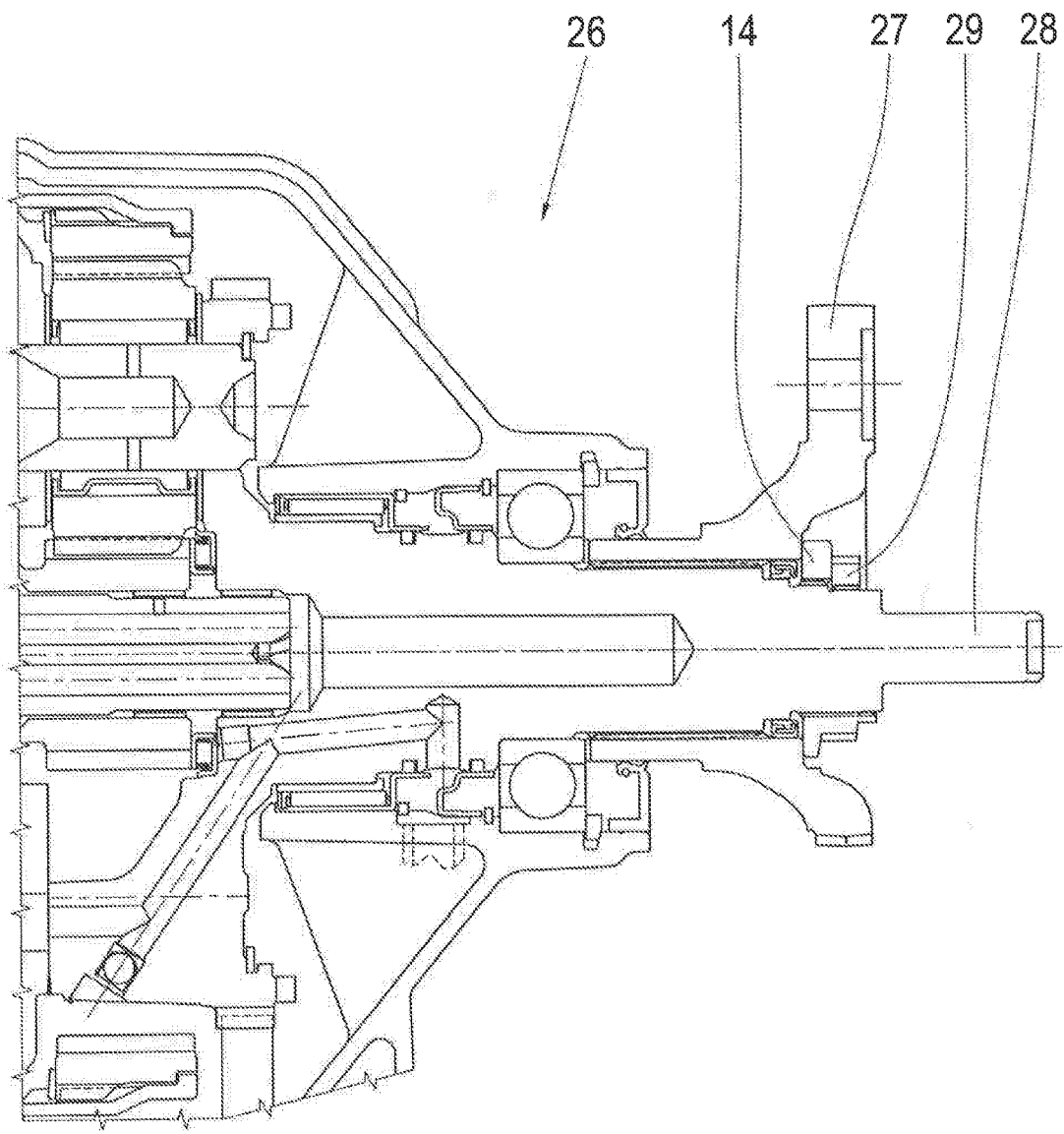
FIG. 5 a sectional view of a part of a transmission, with which a device is used according to a second embodiment of the invention.

FIG. 5 shows a second application example of the invention. FIG. 5 shows a sectional view of part of a transmission 26, with which a mounting flange 27 is mounted on a shaft 28 designed as a drive shaft. The attachment is accomplished by a clamping element 29 formed as a clamping nut with the assistance of the device 14, whereas, in principle, the manner of the formation of the mounting corresponds to the variants described for FIGS. 1 through 4. In this respect, reference is made to the that described thereto.

Figure 6B:
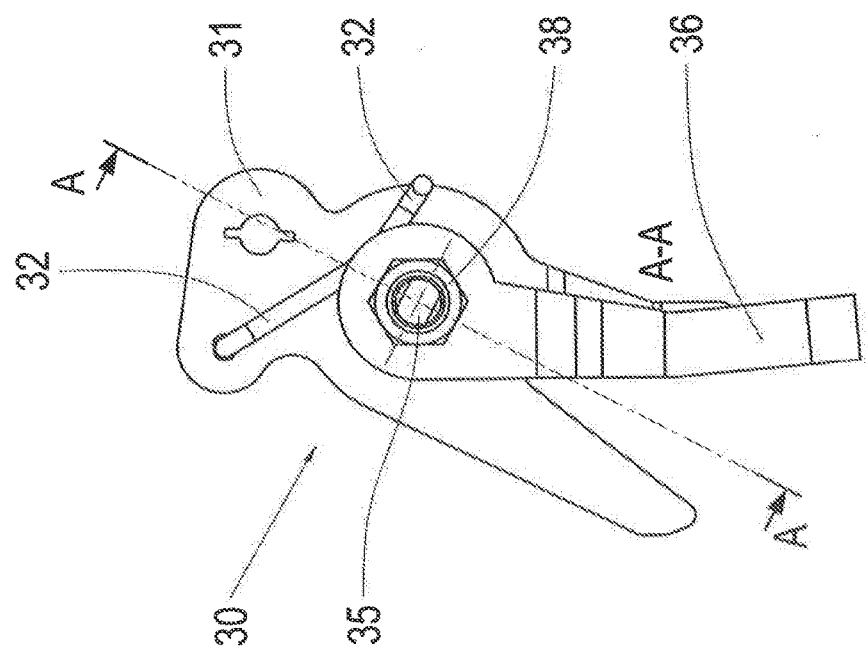
FIG. 6B a detailed drawing and a sectional view of the mounted gear selector from FIG. 6A.
Figure 6B:
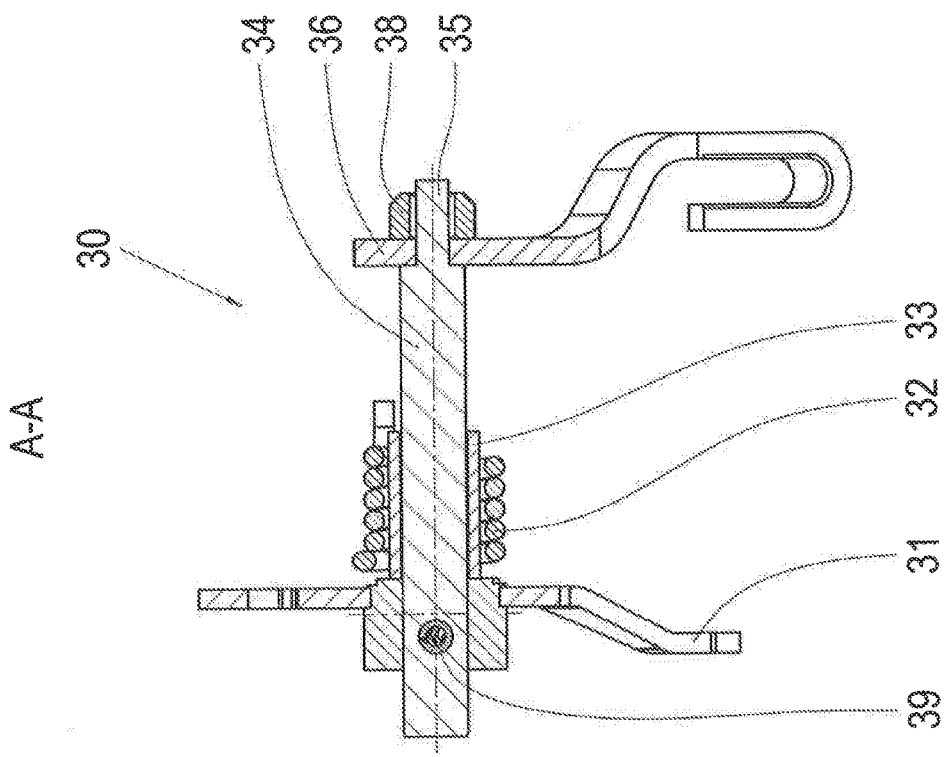

FIG. 6A shows an exploded view of a gear selector 30 for an automatic transmission 26 known from the prior art; FIG. 6B shows a detailed drawing and a sectional view of this gear selector 30 in the mounted state. The gear selector 30 includes a notched disk 31, a spring 32, a bearing 33, a shaft 34 designed as a selector shaft, a selector lever 36, a clamping element 38 and a spring pin 39. The notched disk 31 is plugged into the shaft 34, whereas the spring pin 39 establishes a positive-locking connection between the notched disk 31 and the shaft 34. The spring 32 that is likewise plugged into the shaft 34 is mounted by the bearing 33 on the shaft 34 and, with one of its two ends, engages in the notched disk 31 in a positive-locking manner. At the end of the shaft 34 opposite to the notched disk 31, a driving profile 35, into which the selector lever 36 is plugged, is provided. For this purpose, the selector lever 36 features a recess 37 corresponding to a driving profile 35. Counter to the release of the selector lever 36 from the shaft 34, the clamping element 38 designed as clamping nut is screwed into a corresponding external thread of the driving profile 35.

In this embodiment, the driving profile 35 is formed as a so-called "dihedral profile," which is known from the prior art, at which the external thread that is provided at the end of the selector shaft 35 and corresponds to the internal thread of the clamping nut 38 is partially milled in a manner axially parallel to the center axis of the selector shaft 34 in such a manner that a flat surface arises to the left and right of the center axis of the selector shafts, whereas such two surfaces are oriented in a manner parallel to each other. Essentially, such a "dihedral profile" is a spline with a cog and a pressure angle of 0 degrees.

In the mounted state, the shaft 34 penetrates a housing bore hole 41 of a transmission housing 40 such that the notched disk 31, the spring 32 and the bearing 33 are, viewed spatially, arranged in the interior of the transmission housing 40, while the selector lever 36 and the clamping element 38 are, viewed spatially, arranged outside of the transmission housing 40. Thereby, the spring 32 pre-tensions the notched disk 31 with respect to the transmission housing 40. For actuating the gear selector 30, a Bowden cable (not shown more in more detail here) is provided, the free end of which engages in the selector lever 36 and the outer shell of which is supported at the transmission housing 40 by a Bowden cable holder 42.

In practice, vibrations of the transmission housing 40 and the automatic transmission 26 may lead to the undesired release of the clamping nut 38 at the thread of the selector shaft 34, with the result that the connection between the selector shaft 34 and the selector lever 36 is subject to backlash, by which the mechanical transmission of the shift command, introduced by the driver into the Bowden cable, to the notched disk 31 provided in the automatic transmission 26 for the selection of driving range and gears is undesirably inaccurate.

Figure 7:
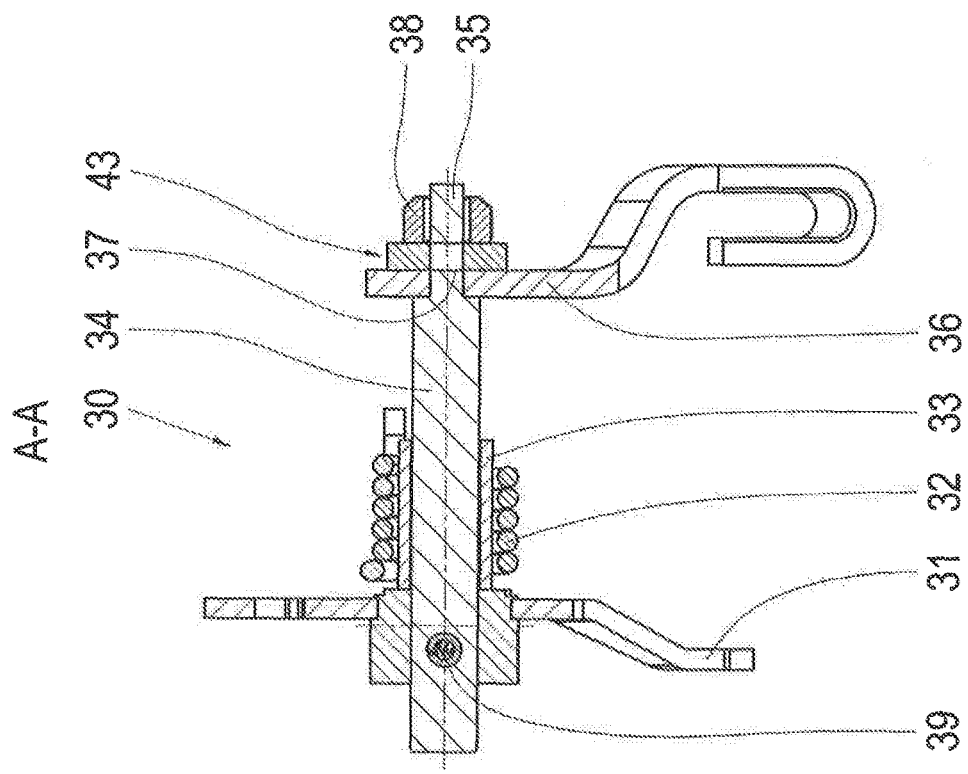
FIG. 7 a sectional view of a gear selector for a transmission, with which a device is used according to a third embodiment of the invention.
Figure 7:
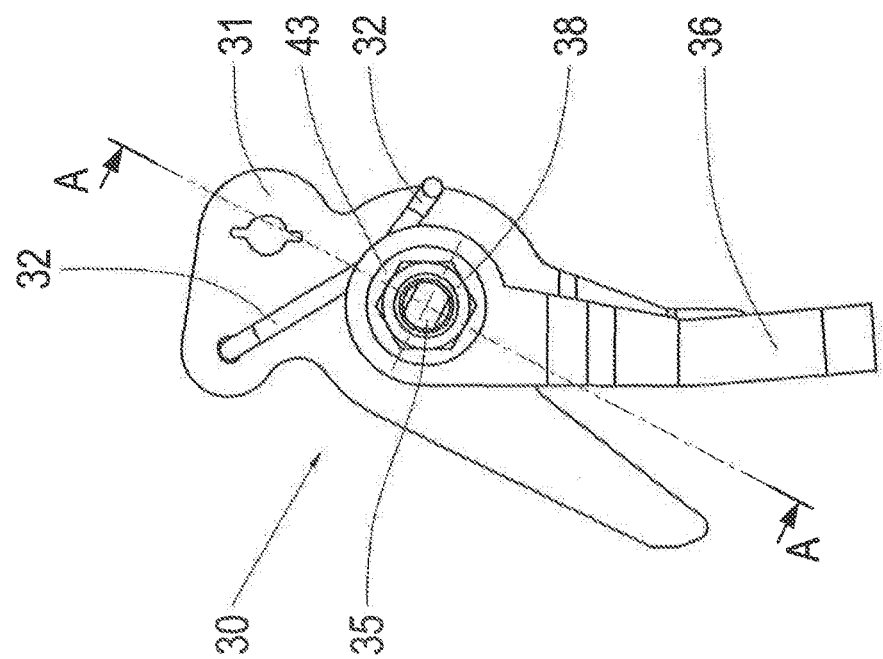
Figure 8:
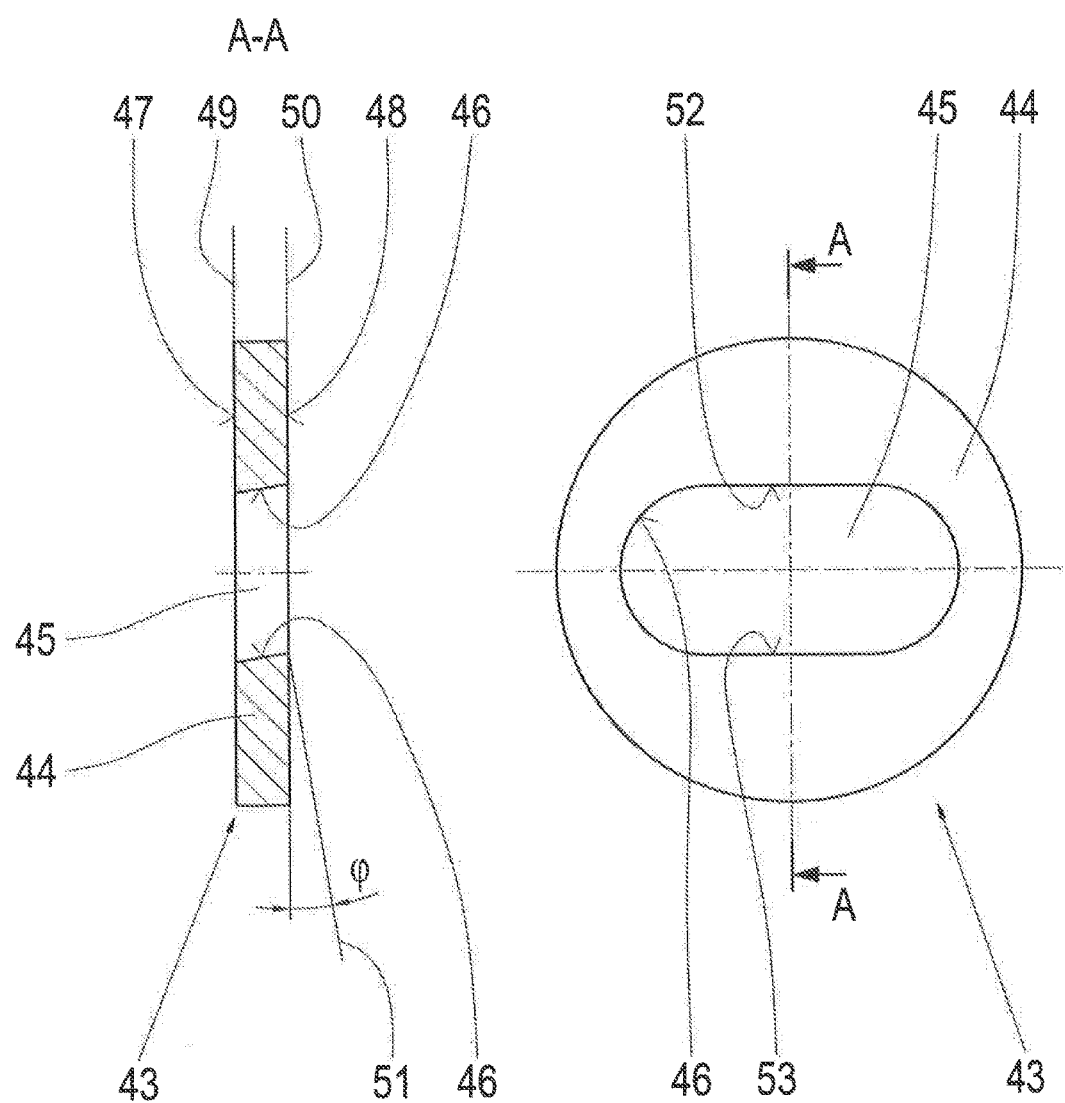
FIG. 8 a detail view and a sectional view of the device from FIG. 7.

FIG. 7 shows a third application example of the invention. FIG. 7 shows a sectional view of a gear selector 30 for an automatic transmission, which is based on the design of the gear selector 30 known from FIGS. 6A/6B. Thereby, FIG. 7 shows the gear selector 30 in the mounted state, whereas, for the simplicity of the illustration, the transmission housing that is penetrated by the selector shaft 34 has been omitted in the drawing. In contrast to FIGS. 6A/6B, the force-fitting screw connection between the clamping element 38 and the shaft 34 is secured against unintentional release by the device 43 in accordance with exemplary aspects of the invention. Thereby, based on its tilting by the angle φ, the device 43 tensions the clamping element 38 formed as a clamping nut with respect to the selector lever 36, whereas, in principle, the manner of the formation of the mounting corresponds to the variants described for FIGS. 1 through 4. FIG. 8 shows an enlarged view (top view and section view) of the device 43 in accordance with exemplary aspects of the invention used in FIG. 7.

As can be seen in this case, the device 43 is formed by a one-piece, disk-shaped structure 44, which is penetrated in the axial direction with an inner contour 45. Within the gear selector 30, the device 43 is set with its inner contour 45 on the shaft 34 designed as a selector shaft, whereas a torque-proof connection with the shaft 34 is realized by a driving profile 46, which is arranged on the inner contour 45 of the structure 44.

The device 43 has, in an axial manner on both sides, the contact surfaces 47 and 48, of which, within the gear selector 30, the contact surface 47 establishes a contact of the device 43 with the selector lever 36 and the contact surface 48 establishes a contact with the clamping element 38. Thereby, the contact surfaces 47 and 48 run in a radial manner into the planes 49 and 50 corresponding to each, and are aligned to each other in a parallel manner.

As a special feature, a profile plane 51, along which the driving profile 46 extends, now runs at an angle φ both to the plane 49 and the plane 50. As a result, the driving profile 46 is tilted from the radial line by the angle φ, whereas, in this case, the angle φ is (as an example) in the range of 1.5° to 2.5°. In other words, this means that the central axis of the driving profile 46 is tilted by the angle φ with respect to the central axis of the disk-shaped structure 44.

Within the framework of the assembly of the gear selector 30, the selector shaft 35 is initially completed with the notched disk 31, the spring pin 39, the bearing 33 and the spring 33. Subsequently, the pre-mounted selector shaft 34 is pushed from the interior of the transmission housing through the corresponding transmission housing bore hole, such that the shaft end of the selector shaft 34 provided with the profile 35 is outside of the transmission housing. Accordingly, the selector lever 36 is plugged into the free shaft end of the selector shaft 34. On the part of the selector lever 36, a recess 37 corresponding to the dihedral profile 35 of the selector shaft 34 is formed for this purpose. Subsequently, the device 43 is threaded onto the free shaft end of the selector shaft 34. On the part of the selector shaft 34, the profile 35 corresponding to the inner contour 46 of the device 43 is formed for this purpose; in the present application example, this is a dihedral profile fit to the driving profile 46 of the device 43. However, the profile 35 of the selector shaft 34 is aligned in the radial direction and, in contrast to the device 43, is not tilted at an angle. In addition, the driving profile 46 and the profile 35 are designed for each other in such a manner that a clearance fit is predominant and the device 43 can be easily threaded accordingly.

If, within the framework of the assembly of the gear selector 30, the clamping element 38 is now screwed onto the shaft 34, the clamping element 38 arrives in contact with the contact surface 48 of the device 43 and subsequently presses the device 43, with its contact surface 47, at the selector lever 36. However, since the two contact surfaces 47 and 48 run to the profile plane 51 of the driving profile 46 at the angle φ, the clamping of the device 43 between the selector lever 36 and the clamping element 38 results in a tilting of the driving profile 46 of the device 43 to the profile 35 of the selector shaft 34 by the angle φ, whereas the selector lever 36 on its part is supported on an abutment shoulder of the selector shaft 34. Due to this tilting, the flanks 52 and 53 of the driving profile 46 are pressed, at least in sections, at flanks of the profile 35, and thus, in such areas, any backlash is eliminated. Thereby, the clearance fit predominant upon the threading of the device 43, in some sections of the circumferential side, is transferred into press fits.

In the present case, the angle φ is selected to be so large that the formation of press fits takes place over the largest possible areas of the flanks 52, 53, whereas, on the part of the device 43 and, if applicable, the shaft 34, in addition to elastic deformations, plastic deformations may also arise, in part due to the selected angle φ. Due to the formation of press fits, the device 43 subsequently may no longer rotate with respect to the shaft 34, such that no micro-movements whatsoever can be transferred to the clamping element 38.

Figure 9A:
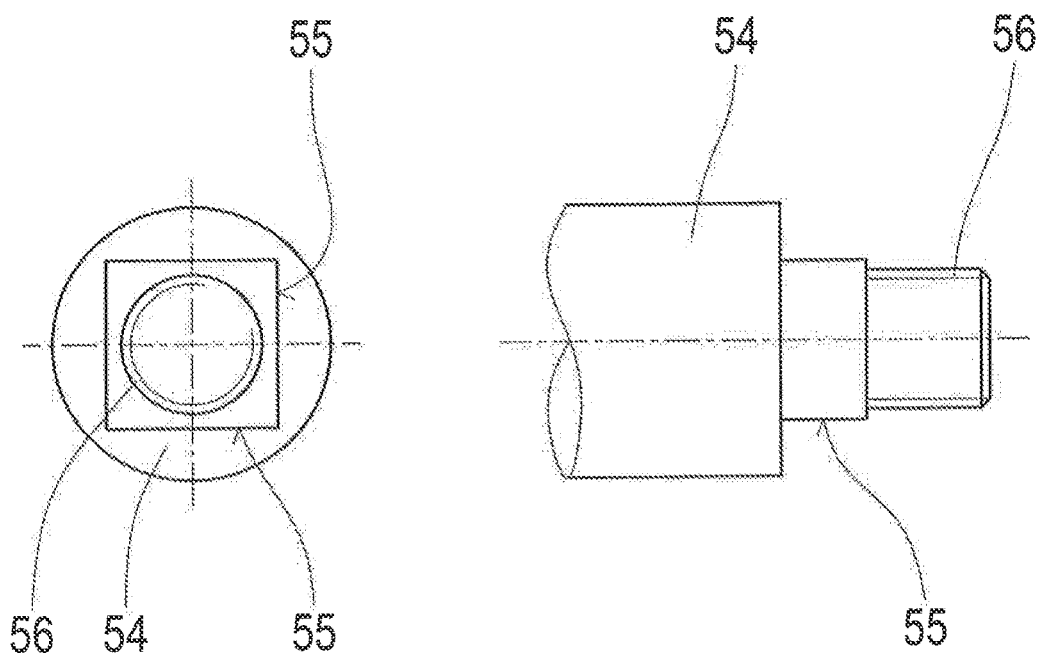
FIG. 9A a sectional view of a selector shaft of a gear selector for an automatic transmission.
Figure 9B:
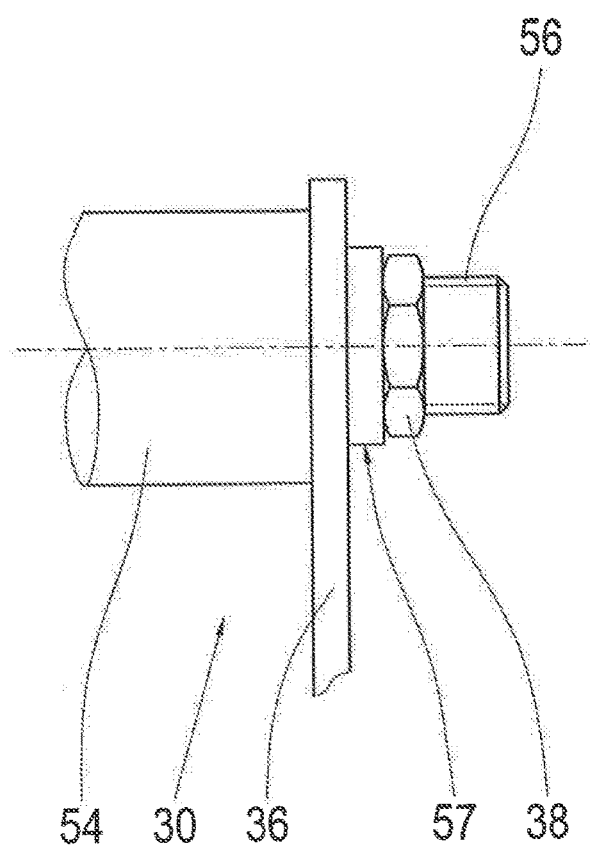
FIG. 9B a sectional view of the selector shaft from FIG. 9A, with which a device is used according to a fourth embodiment of the invention.
Figure 10:
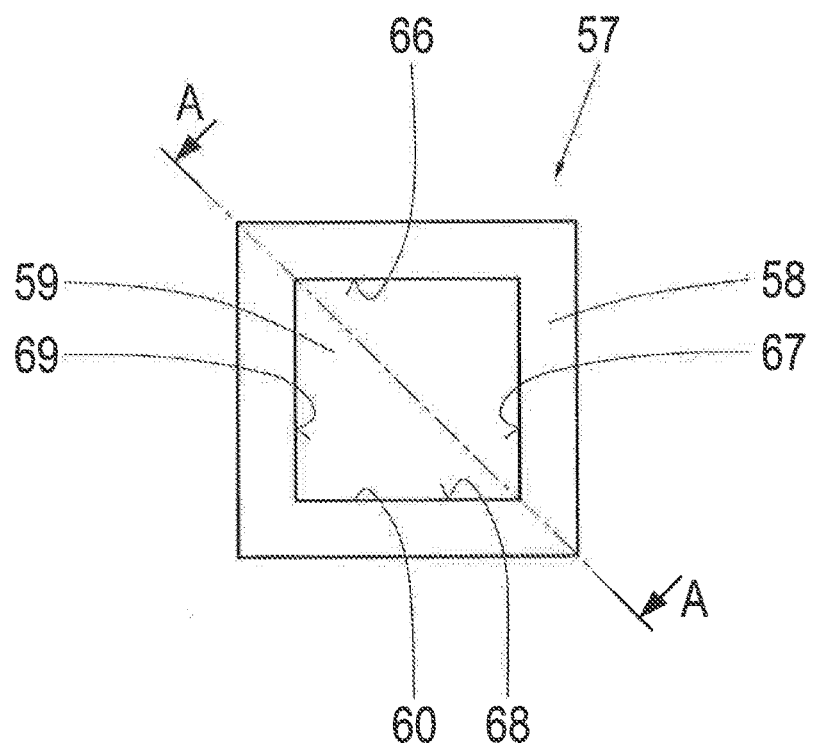
FIG. 10 a detail view and a sectional view of the device from FIG. 9B.
Figure 10:
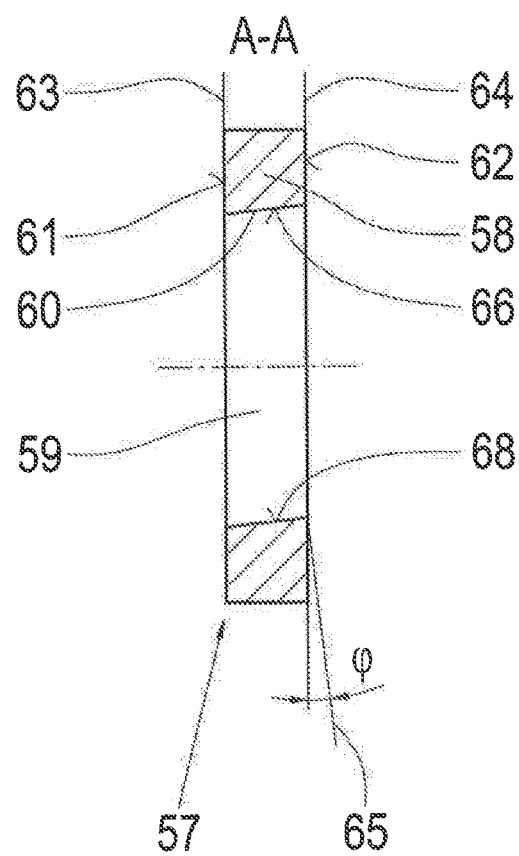

Based on FIGS. 9A, 9B and 10, a fourth application example of the invention will be explained in more detail below. FIG. 9A and FIG. 9B show a cut of a view of a shaft 54 formed as a selector shaft that, as an alternative to the shaft 34 provided in FIG. 7, may be used with the gear selector 30 shown in FIG. 7. In FIG. 9A, the selector shaft 54 is shown as an individual part. In FIG. 9B, the selector shaft 54 is shown in the mounted state, together with the selector lever 36, the device 57 in accordance with exemplary aspects of the invention and the clamping element 38 formed as a clamping nut. The (external) thread provided for screwing the clamping nut 38 onto the selector shaft 54 is designated with 56. In contrast to FIG. 7, in which the profile 35 provided for the positive-locking receiving of the selector lever 36 and the device 43 at the selector shaft 34 is formed as a so-called "dihedral profile," in FIG. 9A/FIG. 9B, a profile 55, which is formed as a so-called "square profile," is provided for the positive-locking receiving of the selector lever 36 and the device 54 at the selector shaft 54. Essentially, such a "square profile" is a spline with four cogs and a pressure angle of 45 degrees. FIG. 10 shows, in a top view and section view, the device 57 in accordance with exemplary aspects of the invention used in FIG. 9B as an individual part.

As can be seen in this case, the device 57 is formed by a one-piece, disk-shaped structure 58, which features a square-shaped outer contour and is penetrated in the axial direction with a square-shaped inner contour 59. Within the gear selector, the device 57 is set with its inner contour 59 on the shaft 54 designed as a selector shaft, whereas a torque-proof connection with the shaft 54 is realized by a driving profile 60, which is arranged on the inner contour 59 of the structure 58.

The device 57 has, in an axial manner on both sides, the contact surfaces 61 and 62, of which, within the gear selector, the contact surface 61 establishes a contact of the device 57 with the selector lever 36 and the contact surface 62 establishes a contact with the clamping element 38. Thereby, the contact surfaces 61 and 62 run in a radial manner into the planes 63 and 64 corresponding to each, and are aligned to each other in a parallel manner.

As a special feature, a profile plane 65, along which the driving profile 60 extends, now runs at an angle φ both to the plane 63 and the plane 64. As a result, the driving profile 60 is tilted from the radial line by the angle φ, whereas, in this case, the angle φ is (as an example) in the range of 1.5° to 2.5°. In other words, this means that the central axis of the driving profile 60 is tilted by the angle φ with respect to the central axis of the disk-shaped structure 57.

Within the framework of the assembly of the gear selector, the selector shaft 54 completed with the notched disk, the spring pin, the bearing and the spring 33 is pushed from the interior of the transmission housing through the corresponding transmission housing bore hole, such that the shaft end of the selection shaft 54 provided with the profile 55 and the thread 56 is outside of the transmission housing. Accordingly, the selector lever 36 is plugged into the free shaft end of the selector shaft 54. On the part of the selector lever 36, a recess corresponding to the square profile 55 of the selector shaft 54 is formed for this purpose. Subsequently, the device 57 is threaded onto the free shaft end of the selector shaft 54. On the part of the selector shaft 54, the profile 55 corresponding to the inner contour 59 of the device 57 is formed for this purpose; in the present application example, this is a square profile fit to the driving profile 60 of the device 57. However, the profile 55 of the selector shaft 54 is aligned in the radial direction and, in contrast to the device 57, is not tilted at an angle. In addition, the driving profile 60 and the profile 55 are designed for each other in such a manner that a clearance fit is predominant and the device 57 can be easily threaded accordingly.

If, within the framework of the assembly of the gear selector, the clamping element 38 is now screwed onto the shaft 54, the clamping element 38 arrives in contact with the contact surface 62 of the device 57 and subsequently presses the device 57, with its contact surface 61, at the selector lever 36. However, since the two contact surfaces 61 and 62 run to the profile plane 65 of the driving profile 60 at the angle φ, the clamping of the device 57 between the selector lever 36 and the clamping element 38 results in a tilting of the driving profile 60 of the device 57 to the profile 55 of the selector shaft 54 by the angle φ, whereas the selector lever 36 on its part is supported on an abutment shoulder of the selector shaft 54. Due to this tilting, the flanks 66, 67, 68 and 69 of the driving profile 60 are pressed, at least in sections, at flanks of the profile 55, and thus, in such areas, any backlash is eliminated. Thereby, the clearance fit predominant upon the threading of the device 57, in some sections of the circumferential side, is transferred into press fits.

In the present case, the angle φ is selected to be so large that the formation of press fits takes place over the largest possible areas of the flanks 66, 67, 68, 69, whereas, on the part of the device 57 and, if applicable, the shaft 54, in addition to elastic deformations, plastic deformations may also arise, in part due to the selected angle φ. Due to the formation of press fits, the device 57 subsequently may no longer rotate with respect to the shaft 54, such that no micro-movements whatsoever can be transferred to the clamping element 38.

Thus, by the arrangement of a device in accordance with exemplary aspects of the invention, the securing of a clamping element against unintentional release can be realized in a reliable manner, with low installation costs at the same time. However, apart from a loss prevention device, a device in accordance with exemplary aspects of the invention may also be designed as a torque-transferring component, such as a gear wheel or a brake disk, whereas, in this case, the design in accordance with exemplary aspects of the invention of a device is used to form a press connection with a shaft coupled with it.

Modifications and variations can be made to the embodiments illustrated or described herein without departing from the scope and spirit of the invention as set forth in the appended claims.

REFERENCE SIGNS

1 Shaft; bevel pinion shaft
2 Bevel pinion
3 Spline
4 Bearing seat area
5 Tapered roller bearing
6 Angular ball bearing
7 Internal ring
8 Internal ring
9 External ring
10 External ring
11 Clamping element; clamping nut
12 Internal thread
13 External thread
14 Device
15 Structure
16 Bore hole
17 Driving profile
18 Contact surface
19 Contact surface
20 Plane
21 Plane
22 Profile plane
23 Profile; tooth profile
24 Flank
25 Flank
26 Transmission; automatic transmission
27 Mounting flange
28 Shaft; drive shaft
29 Clamping element; clamping nut
30 Gear selector
31 Notched disk
32 Thread
33 Bearing
34 Shaft, selector shaft
35 Profile; dihedral profile
36 Selector lever
37 Recess
38 Clamping element; clamping nut
39 Spring pin
40 Transmission housing
41 Transmission housing bore hole
42 Bowden cable holder
43 Device
44 Structure
45 Inner contour
46 Driving profile
47 Contact surface
48 Contact surface
49 Plane
50 Plane
51 Profile plane
52 Flank
53 Flank
54 Shaft, selector shaft
55 Profile; square profile
56 Thread
57 Device
58 Structure
59 Inner contour
60 Driving profile
61 Contact surface
62 Contact surface
63 Plane
64 Plane
65 Profile plane
66 Flank
67 Flank
68 Flank
69 Flank
φ Angle

The invention claimed is:

1. A device for securing a clamping element against unintentional release, comprising:
a disk-shaped structure penetrated by a bore hole, the bore hole defining an axis, the disk-shaped structure having an inner surface with a driving profile defined by the bore hole, the disk-shaped structure positionable on a component such that the driving profile engages a profile on the component to establish a torque-proof coupling of the disk-shaped structure and the component about the axis, the disk-shaped structure having a pair of contact surfaces, each contact surface of the pair of contact surfaces running radially and positioned at a respective axial side of the disk-shaped structure, wherein a profile plane of the driving profile is tilted at an angle with respect to a radial plane of each contact surface of the pair of contact surfaces,
wherein the profile plane of the driving profile is perpendicular to the axis, and
wherein the driving profile is defined by the bore hole such that the inner surface is constant along the axis.

2. The device of claim 1, wherein the angle is selected such that, when the disk-shaped structure is positioned on the component and the driving profile tilts with respect to the profile of the component in at least a circumferential area, no backlash is present between the driving profile and the profile of the component.

3. The device of claim 1, wherein the driving profile is formed by at least one individual profile, the at least one individual profile having a pair of flanks oriented circumferentially, at least one flank of the pair of flanks has wedge-shaped profile.

4. The device of claim 3, wherein the driving profile forms a toothing.

5. The device of claim 4, wherein the driving profile forms an involute toothing.

6. The device of claim 5, wherein the angle is calculated according to $$j_n - \left[\left(d \cdot \sin\alpha_t - \frac{j_n}{2}\right) \cdot \cos\varphi + \frac{b}{2} \cdot \sin\varphi - \left((d \cdot \sin\alpha_t) - \frac{j_n}{2}\right)\right] \leq 0,$$

where
$j_n$ is a normal backlash of the involute toothing,
$\alpha_t$ is an operating pressure angle,
d is a pitch circle diameter, and
φ is the angle at which the profile plane of the driving profile is tilted.

7. The device of claim 1, wherein the angle is at least one and a half degrees.

8. A device for securing a clamping element against unintentional release, comprising:
a disk-shaped structure penetrated by a non-circular inner contour, the non-circular inner contour defining an axis, the disk-shaped structure having a surface with a driving profile defined by the non-circular inner contour, the disk-shaped structure positionable on a component such that the driving profile engages a profile on the component to establish a torque-proof coupling of the disk-shaped structure and the component about the axis, the disk-shaped structure having a pair of contact surfaces, each contact surface of the pair of contact surfaces running radially and positioned at a respective axial side of the disk-shaped structure,
wherein at least one profile plane of the driving profile is tilted at an angle with respect to a radial plane of each contact surface of the pair of contact surfaces,
wherein the profile plane of the driving profile is perpendicular to the axis, and
wherein the driving profile is defined by the non-circular inner contour such that the inner surface is constant along the axis.

9. The device of claim 8, wherein the angle is selected such that, when the disk-shaped structure is positioned on the component and the driving profile tilts with respect to the profile of the component in at least a circumferential area, no backlash is present between the driving profile and the profile of the component.

10. The device of claim 8, wherein the driving profile is a dihedral profile.

11. The device of claim 8, wherein the driving profile is a square profile.

12. The device of claim 8, wherein the angle is at least one and a half degrees.

13. A mounting arrangement, comprising:
a shaft;
a clamping element on the shaft such that the clamping element produces a pre-tensioning acting in an axial direction; and
a device pre-tensioned in the axial direction by the clamping element, the device comprising
a disk-shaped structure penetrated by a bore hole, the bore hole defining an axis, the disk-shaped structure having an inner surface with a driving profile defined by the bore hole, the disk-shaped structure having a pair of contact surfaces, each contact surface running radially and positioned at a respective axial side of the disk-shaped structure,
wherein a profile plane, along which the driving profile extends, is tilted at an angle with respect to a radial plane of each contact surface of the pair of contact surfaces, one of the pair of contact surfaces positioned on the clamping element and the other of the pair of contact surfaces positioned on an additional component, the driving profile of the disk-shaped structure engaging in a torque-proof manner a profile of the shaft about the axis, the profile of the shaft having a clearance fit corresponding to the driving profile when the device is not pre-tensioned, the driving profile tilted to the angle by the clamping element relative to the profile of the shaft such that no backlash is present between the driving profile and the profile of the shaft in at least one area in a circumferential direction,
wherein the profile plane of the driving profile is perpendicular to the axis, and
wherein the driving profile is defined by the bore hole such that the inner surface is constant along the axis.

14. The mounting arrangement of claim 13, wherein at least one of the driving profile of the device or the profile of the shaft is plastically deformed by the pre-tensioning of the clamping element.

15. The mounting arrangement of claim 13, wherein the component is a roller bearing, the pre-tensioning along the axial direction adjustable by the clamping element.

16. The mounting arrangement of claim 13, wherein the component is a mounting flange.

17. The mounting arrangement of claim 13, wherein the component is a selector lever of a gear selector for a transmission.

18. A mounting arrangement:
a shaft;
a clamping element on the shaft such that the clamping element produces a pre-tensioning acting in an axial direction; and
a device pre-tensioned in the axial direction by the clamping element, the device comprising
a disk-shaped structure penetrated by a non-circular inner contour, the non-circular inner contour defining an axis, the disk-shaped structure having an inner surface with a driving profile defined by the non-circular inner contour, the disk-shaped structure having a pair of contact surfaces, each contact surface of the pair of contact surfaces running radially and positioned at a respective axial side of the disk-shaped structure, wherein at least one profile plane, along which the driving profile extends, is tilted at an angle with respect to a radial plane of each contact surface of the pair of contact surfaces, one of the pair of contact surfaces positioned on the clamping element and the other of the pair of contact surfaces positioned on an additional component, the driving profile of the disk-shaped structure engaging in a torque-proof manner a profile of the shaft about the axis, the profile of the shaft having a clearance fit corresponding to the driving profile when the device is not pre-tensioned, the driving profile tilted to the angle by the clamping element relative to the profile of the shaft such that no backlash is present between the driving profile and the profile of the shaft in at least one area in a circumferential direction, wherein the profile plane of the driving profile is perpendicular to the axis, and wherein the driving profile is defined by the non-circular inner contour such that the inner surface is constant along the axis.

19. The mounting arrangement of claim 18, wherein at least one of the driving profile of the device or the profile of the shaft is plastically deformed by the pre-tensioning of the clamping element.

20. The mounting arrangement of claim 18, wherein the component is a roller bearing, the pre-tensioning along the axial direction adjustable by the clamping element.

21. The mounting arrangement of claim 18, wherein the component is a mounting flange.

22. The mounting arrangement of claim 18, wherein the component is a selector lever of a gear selector for a transmission.

* * * * *